March 10, 1964 J. W. HOWARD 3,124,752

PULSE GATE NOISE LIMITER CONTAINING FULL WAVE BRIDGE DETECTOR

Filed July 3, 1961 2 Sheets-Sheet 1

INVENTOR.
JAMES WESLEY HOWARD
BY
Huebner & Worrel
ATTORNEYS.

March 10, 1964 J. W. HOWARD 3,124,752

PULSE GATE NOISE LIMITER CONTAINING FULL WAVE BRIDGE DETECTOR

Filed July 3, 1961 2 Sheets-Sheet 2

INVENTOR.
JAMES WESLEY HOWARD
BY
Huebner & Worrel
ATTORNEYS.

United States Patent Office 3,124,752
Patented Mar. 10, 1964

3,124,752
PULSE GATE NOISE LIMITER CONTAINING FULL WAVE BRIDGE DETECTOR

James Wesley Howard, 510 S. Gloster, Tupelo, Miss.
Filed July 3, 1961, Ser. No. 121,463
8 Claims. (Cl. 325—482)

This invention relates to a device for use in conjunction with a conventional communications receiver to provide instantaneous limiting of foreign noise pulses occuring in the receiver and to permit clear reception of messages having relatively low receiver signal strength, without interference from relatively high impulse noise levels.

Operation of the device of the present invention is completely automatic, and no switching is required. Receiver operation is influenced by the device of the present invention only when there is present a foreign noise impulse of a magnitude greater than that of the desired signal. Furthermore, the desired signal is never interrupted, but passes through the receiver in the normal manner and speed, without blanking or holding action.

The device is particularly useful with mobile frequency modulation radio equipment, in which satisfactory clear signal reception is often prevented by man-made static, such as that produced by the ignition systems of automotive equipment, high-power lines, diathermy equipment, and other static producing devices or conditions closely proximate to the receiver. Normally, such static may render the receiver practically ineffective, particularly if the receiver is being operated close to the limit of the transmission range of the transmitter from which the desired signal originates.

Several forms of devices have been offered in an attempt to meet the foreign impulse problem, many of them being complicated, expensive to manufacture, difficult to install in existing receivers, and non-automatic. These other devices are all of the "blanking" type, which interrupt the signal carrier for a time sufficient to allow the foreign impulse to die. Some of them are bulky and cannot be readily installed in or with existing receivers. Others require substantial additional power for operation, which places an additional drain on the battery of the mobile unit in which the receiver is installed.

An object of the present invention is therefore to provide a device which will limit foreign impulse noises in a receiver so that said noises will not adversely affect clear signal reception, even at distances remote from a transmitter.

Another object of the invention is to provide a noise limiter for an FM receiver which will keep additional power consumption to a minimum.

Still another object of the invention is to provide such a device which is small and compact and readily installed in or with existing receivers.

A further object of the invention is to provide such a device which is simple and inexpensive to manufacture, assemble and install.

Still a further object of the invention is to provide such a device which uses standard components and does not require complicated circuitry.

Another object of the invention is to provide such a device which requires a minimum of service and which, even if out of order, will not interfere with the normal operation of, or disable, the standard receiver.

Still another object of the invention is to provide such a device which is completely automatic in operation so that, when installed, for instance, as a part of a mobile unit in a vehicle, no switching is required, and the operator of the vehicle may concentrate on his driving, without being required to give attention to the operation of a switch.

With these and other objects in view, the invention consists of the construction, arrangement and combination of the various parts of the device whereby the objects contemplated are attained, as hereinafter set forth, pointed out in the appended claims, and illustrated in the accompanying drawings.

Figure 1:
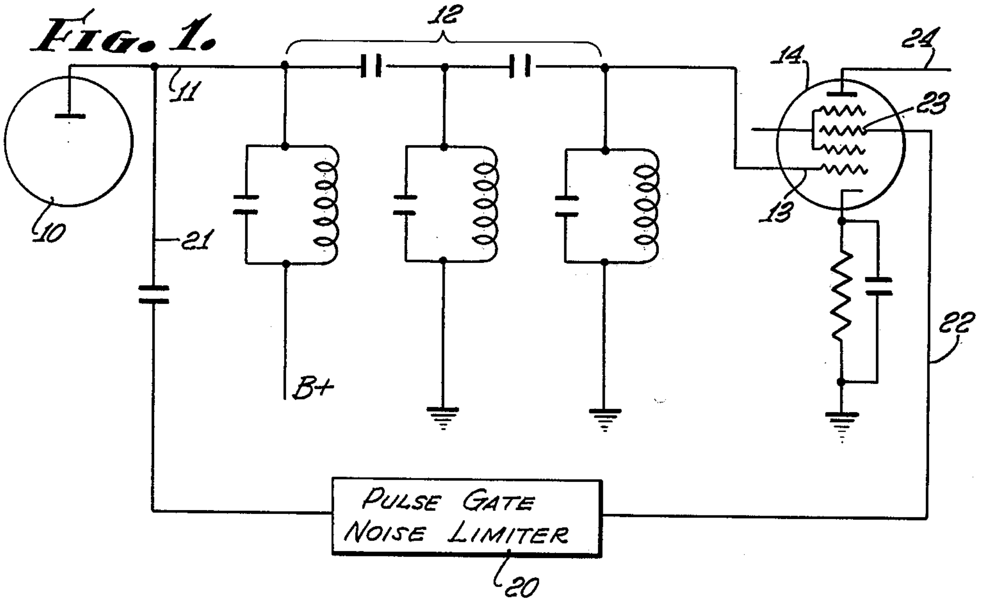
FIGURE 1 is a diagrammatic view showing the manner in which the device of the present invention is connected to a conventional radio receiver circuit.

Referring at first to FIGURE 1 of the drawings, a first mixer 10 of a conventional frequency modulation radio receiver is shown. Said first mixer 10 is connected to the input radio frequency stage or stages and the oscillator of the receiver (not shown). The intermediate frequency carrier passes from the plate circuit 11 of the first mixer 10 through a filter circuit generally designated by the numeral 12, to a control element 13 of a first intermediate frequency amplifier 14. Said first intermediate frequency amplifier 14 is a tube of a type having at least two control elements.

Figure 2:
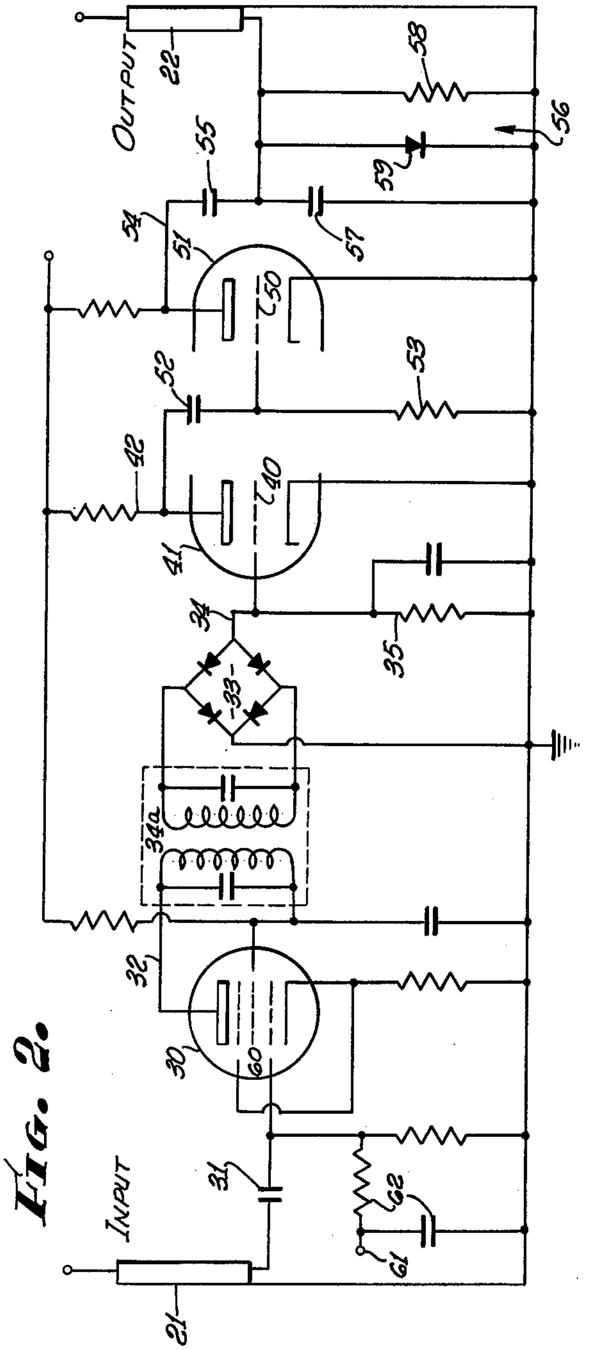
FIGURE 2 is a diagrammatic view showing details of a presently preferred embodiment of the device of the present invention.

The pulse gate noises limiter 20 of the present invention is shown in block diagram in FIGURE 1, and in detail in FIGURE 2. The input circuit 21 of noise limiter 20 is connected to the plate circuit 11 of first mixer 10 and to noise limiter 20 and serves to continuously conduct a sample of the carrier signal with the impulse noise therein in plate circuit 11 to noise limiter 20.

Figure 3:
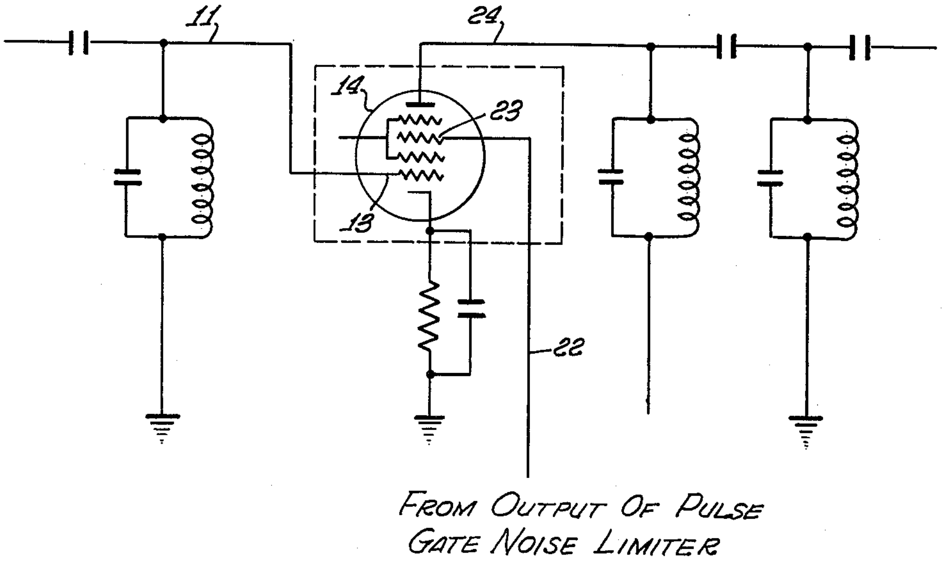
FIGURE 3 is a diagrammatic view showing details of the connection of the output connection of the device of the present invention to the first intermediate frequency stage of a receiver.

Referring to FIGURE 3 of the drawings, the output circuit 22 of noise limiter 20 is connected to a second control element 23 of first intermediate frequency amplifier 14. The noise limiter 20 provides negative biasing pulses to said second control element 23 of first intermediate frequency amplifier 14 so as to limit the amplitude of foreign amplitude modulation noise pulses passed on through first intermediate frequency amplifier 14 to subsequent stages of the receiver by way of plate circuit 24.

Referring now to FIGURE 2, the input circuit 21 continuously feeds the sample of the carrier signal with the impulse noise therein to a radio frequency amplifier 30 through a suitable coupling capacitor 31. The output circuit 32 of radio frequency amplifier 30 is coupled to a negative full wave diode bridge rectifier or full wave bridge detector 33 by means of a conventional radio frequency transformer 34*a* which is tuned to a frequency substantially equal to the intermediate frequency signal output of first mixer 10. The action of the circuit of diode bridge rectifier or detector 33 is such that for every one-half cycle of impulse noise there is a negative pulse output.

The output circuit 34 of bridge rectifier 33 is connected to grid 40 of a first pulse amplifier 41. A resistor 35 is connected to ground and to output circuit 34 of bridge rectifier 33 to control the negative pulses that are fed to direct current amplifier 41 so that they will be of desired duration and width. Bridge rectifier 33 has the additional function of performing a positive clamp action on the grid 40 of first pulse amplifier 41, to further assist in providing clean negative pulses.

The output circuit 42 of first pulse amplifier 41 is coupled to the grid 50 of a second pulse amplifier 51 by means of a capacitor 52 and a grounded resistor 53. The pulses appear at grid 50 of second pulse amplifier 51 as positive pulses. The output circuit 54 of second pulse amplifier 51 is coupled to noise limiter output circuit 22 through capacitor 55.

Connected to and acting upon noise limiter output circuit 22 is a pulse shaping network 56 comprised of a capacitor 57 and a resistor 58. Shaping network 56 smooths out the rise and fall in the pulses and thereby gives the pulses a more linear rise and decay time, thereby resulting in a smoother control and a more linear type of operation. The resistor 58 modifies the pulse shape so that the pulses are of the desired duration and width to produce proper limiting action in intermediate frequency amplifier 14.

A positive clamp diode 59 is connected to pulse output circuit 22 so as to remove any positive voltage therefrom.

The gain of pulse gate limiter 20 is controlled by applying an automatic pulse control voltage to a control element 60 of the radio frequency amplifier 30 through input connection 61 and resistor-capacitor network 62 so that the greater the amount of this negative voltage, the less the gain of limiter 20, and the lesser the negative voltage, the greater the gain.

The automatic pulse control voltage has a magnitude which corresponds to the magnitude of the received carrier signal independent of unwanted noise impulses received. This is accomplished by deriving the negative voltage from a stage of the receiver circuit which is after the first intermediate frequency amplifier 14 so that only the magnitude of the on frequency carrier signal, and not the noise level, determines the amplitude of the negative voltage. A presently preferred source of the automatic pulse control voltage is to derive it from a resistor network connected in the grid circuit of the first limiter of the receiver, which is a stage in the receiver after first intermediate frequency amplifier 14.

Thus, when the carrier signal is sufficiently strong so that foreign noise impulses are not a problem, the negative voltage will be relatively high and will reduce the gain of limiter 20 so that the output of limiter 20 will not act to limit the carrier signal passing through the main receiver circuit. On the other hand, when the carrier signal is relatively weak and noise impulses would, without the limiter 20, be a serious problem, the negative voltage will be relatively small and limiter 20 will have a high gain to effectively limit noise impulses of greater amplitude than that of the carrier signal.

Figure 4:
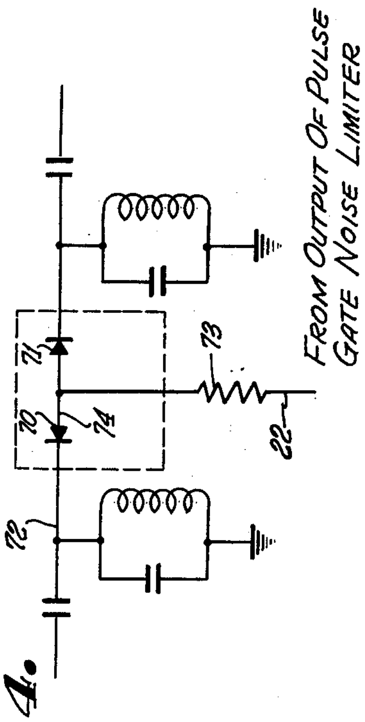
FIGURE 4 is a diagrammatic view showing an alternative output connection of the device of the present invention to a radio frequency signal path of a receiver.

FIGURE 4 illustrates alternative means for introducing the negative pulses from limiter 20 into the receiver circuit. Two diodes 70 and 71 are disposed, in back-to-back relationship to each other, in the receiver first intermediate frequency signal path 72 of the receiver after first mixer 10.

The output circuit 22 of limiter 20 is coupled through a resistor 73 to a central connection 74 between the back-to-back diodes 70 and 71. By this means, the diodes 70 and 71 are biased by the negative pulses from limiter output circuit 22 when excessive noise pulses are present, and this biasing action will limit the amount of coupling of diodes 70 and 71, and hence the level or amplitude of the noise pulses passed on to subsequent stages of the receiver.

The diode gate circuit illustrated in FIGURE 4 for feeding negative pulse information from limiter 20 to the receiver circuit is particularly useful where there is no first intermediate frequency tube stage in the receiver and in transistorized receivers.

It will be understood by those skilled in the art not only that the device of the present invention is readily adaptable for use with transistorized receivers, but also that limiter 20 itself may be transistorized for use either with tube-type receivers or transistorized receivers.

To summarize, the device of the present invention provides a simplified, automatic means of limiting amplitude modulation noise pulses in the radio frequency amplifier section of a receiver by injection at the proper time of negative bias pulses of the proper magnitude and duration. The device of the present invention thereby minimizes the effects of foreign noise pulses and permits effective receiver operation under conditions of low received signal strength and high impulse foreign noise levels.

Although the invention has been herein shown and described in what is conceived to be the most practical and preferred embodiment, it is recognized that departures may be made therefrom within the scope of the invention, which is not to be limited to the details disclosed herein, but is to be accorded the full scope of the claims so as to embrace any and all equivalent structures and methods.

What is claimed is:

1. A pulse gate noise limiter for a radio frequency communications receiver having a receiver first intermediate frequency path, which comprises: first circuit means connected to said receiver first intermediate frequency signal path for sampling the signal in the receiver first intermediate frequency signal path of the receiver; second circuit means connected to said first circuit means for producing direct current pulses comparable to unwanted noise pulses in the receiver first intermediate frequency signal path; and third circuit means connected to said second circuit means, and connected to the receiver first intermediate frequency signal path after the connection of said first circuit means, for introducing said direct current pulses into the receiver first intermediate frequency signal path so as to reduce the amplitude of said unwanted noise pulses, said second circuit means including a radio frequency amplifier having an input portion connected to said first circuit means, and having an output portion, a full wave bridge detector connected to said amplifier output portion so as to rectify the amplified sampled signal, and circuit structure for connecting said full wave bridge detector to said third circuit means.

2. A pulse gate noise limiter as defined in claim 1, wherein said circuit structure includes a pulse amplifier.

3. A pulse gate noise limiter as defined in claim 1, wherein said circuit structure includes a pulse shaping network.

4. A pulse gate noise limiter for a radio frequency communications receiver having a receiver first intermediate frequency signal path, which comprises: a radio frequency amplifier having an input portion connected to the receiver first intermediate frequency signal path, and having an output portion; a radio frequency coupling transformer having an input portion connected to the output portion of said amplifier, and having an output portion; a full wave bridge detector connected to the output portion of said transformer; a first pulse amplifier connected to said full wave bridge detector; a second pulse amplifier connected to said first pulse amplifier; and circuit means connected to said second pulse amplifier and connected to the receiver first intermediate frequency signal path after the connection of the input portion of said radio frequency amplifier, said circuit means including an electronic circuit element in said receiver first intermediate frequency signal path having means biasable by pulses in said circuit means for reducing unwanted noise pulses in said receiver first intermediate frequency signal path.

5. A pulse gate noise limiter as defined in claim 4, wherein the output of said full wave bridge detector comprises negative direct current pulses, and wherein the output of said second pulse amplifier comprises amplified negative direct current pulses.

6. A pulse gate noise limiter as defined in claim 5, wherein said circuit means includes a pulse shaping network for shaping negative pulses in said circuit means to conform to unwanted noise pulses in said receiver first intermediate frequency signal path.

7. A pulse gate noise limiter for a radio frequency communications receiver having a receiver first intermediate frequency signal path, which comprises: a radio frequency amplifier having an input portion connected to the receiver first intermediate frequency signal path, and having an output portion; a radio frequency coupling transformer having an input portion connected to the output portion of said amplifier, and having an output portion; a bridge rectifier connected to the output portion of said transformer; a first pulse amplifier connected to said bridge rectifier; a second pulse amplifier connected to said first pulse amplifier; circuit means connected to said second pulse amplifier and connected to the receiver first intermediate frequency signal path after the connection of the input portion of said radio frequency amplifier, said circuit means including an electronic circuit element in said receiver first intermediate frequency signal path having means biasable by pulses in said circuit means for reducing unwanted noise pulses in said receiver first intermediate frequency signal path; means for controlling amplification, said means comprising an automatic pulse control voltage source in the receiver at a point after the connection of said circuit means to the receiver first intermediate frequency signal path; and an electrical connection between said source and one of said amplifiers.

8. A pulse gate noise limiter as defined in claim 7, wherein the automatic pulse control voltage source is connected to said input portion of said radio frequency amplifier.

References Cited in the file of this patent

UNITED STATES PATENTS

| | | |
|---|---|---|
| 2,438,501 | Hings | Mar. 30, 1948 |
| 2,901,601 | Richardson et al. | Aug. 25, 1959 |
| 2,947,859 | Macdonald | Aug. 2, 1960 |
| 3,014,127 | Vlasak | Dec. 19, 1961 |
| 3,015,026 | Milton et al. | Dec. 26, 1961 |
| 3,098,972 | Howard | July 23, 1963 |